(12) United States Patent
Asai et al.

(10) Patent No.: US 9,158,082 B2
(45) Date of Patent: Oct. 13, 2015

(54) PHOTOELECTRIC CONNECTOR

(71) Applicant: MURATA MANUFACTURING CO., LTD., Kyoto (JP)

(72) Inventors: Hiroshi Asai, Kyoto (JP); Chikara Uratani, Kyoto (JP); Motohisa Tamazawa, Kyoto (JP); Atsushi Konishi, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 186 days.

(21) Appl. No.: 13/874,172

(22) Filed: Apr. 30, 2013

(65) Prior Publication Data
US 2013/0243378 A1 Sep. 19, 2013

Related U.S. Application Data

(63) Continuation of application No. PCT/JP2011/071851, filed on Sep. 26, 2011.

(30) Foreign Application Priority Data

Nov. 5, 2010 (JP) .................. 2010-248027

(51) Int. Cl.
G02B 6/42 (2006.01)
G02B 6/44 (2006.01)
(52) U.S. Cl.
CPC ............ G02B 6/4415 (2013.01); G02B 6/4256 (2013.01); G02B 6/4277 (2013.01); *G02B 6/4292* (2013.01)
(58) Field of Classification Search
None
See application file for complete search history.

(56) References Cited

U.S. PATENT DOCUMENTS

| 5,117,476 | A | 5/1992 | Yingst et al. |
| 7,266,305 | B2 | 9/2007 | Ohe et al. |
| 7,354,313 | B2 | 4/2008 | Kumazawa et al. |
| 7,488,119 | B2 | 2/2009 | Yoshida et al. |
| 7,780,359 | B2 | 8/2010 | Kondo et al. |
| 2006/0270283 | A1 | 11/2006 | Kumazawa et al. |

(Continued)

FOREIGN PATENT DOCUMENTS

| CN | 100472259 C | 3/2009 |
| JP | 07-022010 A | 1/1995 |

(Continued)

OTHER PUBLICATIONS

An Office Letter; "Preliminary Examination Report," issued by the Taiwanese Intellectual Property Office on Dec. 9, 2013, which corresponds to Taiwanese Patent Application No. 100138427 and is related to U.S. Appl. No. 13/874,172.

(Continued)

*Primary Examiner* — Mike Stahl
(74) *Attorney, Agent, or Firm* — Studebaker & Brackett PC

(57) ABSTRACT

A connector, which can protect a photoelectric conversion device from noise and has high durability includes a plug provided at one end of an optical fiber and a receptacle to which the plug is mounted from above. The plug includes a photoelectric conversion device composed of a semiconductor device that is not covered with a metal case and a metal member provided so as to cover an upper side of the photoelectric conversion device. The receptacle includes a metal housing to which the plug is fixed. The plug and the receptacle are fixed to each other only by engagement between the metal member and the metal housing.

11 Claims, 7 Drawing Sheets

(56) References Cited

U.S. PATENT DOCUMENTS

| | | |
|---|---|---|
| 2007/0280603 A1 | 12/2007 | Sakata et al. |
| 2008/0205826 A1 | 8/2008 | Harano et al. |
| 2009/0208168 A1 | 8/2009 | Ishikawa et al. |
| 2009/0297101 A1 | 12/2009 | Ono et al. |
| 2013/0279857 A1* | 10/2013 | Uratani ............... 385/76 |

FOREIGN PATENT DOCUMENTS

| | | | | |
|---|---|---|---|---|
| JP | 3046364 B2 | 5/2000 | | |
| JP | 2004-029342 A | 1/2004 | | |
| JP | 2004-212709 A | * 7/2004 | ............... | G02B 6/42 |
| JP | 2005-099506 A | 4/2005 | | |
| JP | 2006-030868 A | 2/2006 | | |
| JP | 2006-215348 A | 8/2006 | | |
| JP | 2006-331741 A | 12/2006 | | |
| JP | 3902746 B2 | 4/2007 | | |
| JP | 2007-233325 A | 9/2007 | | |
| JP | 2007-286553 A | 11/2007 | | |
| JP | 2007-328018 A | 12/2007 | | |
| JP | 2009-199809 A | 9/2009 | | |
| JP | 2010-135109 A | 6/2010 | | |
| KR | 10-2007-0023638 A | 2/2007 | | |
| WO | 2007/122993 A1 | 11/2007 | | |

OTHER PUBLICATIONS

International Search Report; PCT/JP2011/071851; Oct. 18, 2011.
Written Opinion of the International Searching Authority; PCT/JP2011/071851; Oct. 18, 2011.

* cited by examiner

PHOTOELECTRIC CONNECTOR

CROSS REFERENCE TO RELATED APPLICATIONS

The present application is a continuation of International Application No. PCT/2011/071851 filed on Sep. 26, 2011, and claims priority to Japanese Patent Application No. 2010-248027 filed on Nov. 5, 2010, the entire contents of each of these applications being incorporated herein by reference in their entirety.

TECHNICAL FIELD

The technical field relates to a connector, and particularly relates to a connector used when a signal is transmitted through an optical fiber.

BACKGROUND

As an existing connector, for example, a connector described in Japanese Unexamined Patent Application Publication No. 2006-215348 (Patent Document 1) is known. FIG. 10 is a cross-sectional structure diagram of a connector 500 described in Patent Document 1.

As shown in FIG. 10, the connector 500 includes a plug 502 and a receptacle 506. The plug 502 is provided at one end of an optical fiber 508. The plug 502 is mounted to the receptacle 506 from above. The plug 502 includes a plug-side housing 526, a light emitting/receiving device 536, and a plug-side shell 580. The plug-side housing 526 is made of a resin material. The light emitting/receiving device 536 is a semiconductor device and is mounted to the plug 502. The plug-side shell 580 covers the surface of the plug-side housing 526. The light emitting/receiving device 536 configured as described above is covered with the metal member 580, and thus is less influenced by external noise.

The receptacle 506 includes a receptacle-side housing 566. The receptacle-side housing 566 is made of a resin material. Here, the plug 502 is mounted to the receptacle 506 by the plug-side housing 526 being fitted to the receptacle-side housing 566.

SUMMARY

The present disclosure provides a connector that can protect a photoelectric conversion device from noise and has high durability.

A connector according to an aspect of the present disclosure includes a plug provided at one end of an optical fiber and a receptacle to which the plug is mounted from above. The plug includes a photoelectric conversion device composed of a semiconductor device that is not covered with a metal case and a metal member provided so as to cover an upper side of the photoelectric conversion device. The receptacle includes a metal housing to which the plug is fixed. The plug and the receptacle are fixed to each other only by engagement between the metal member and the metal housing.

DETAILED DESCRIPTION

Figure 1:
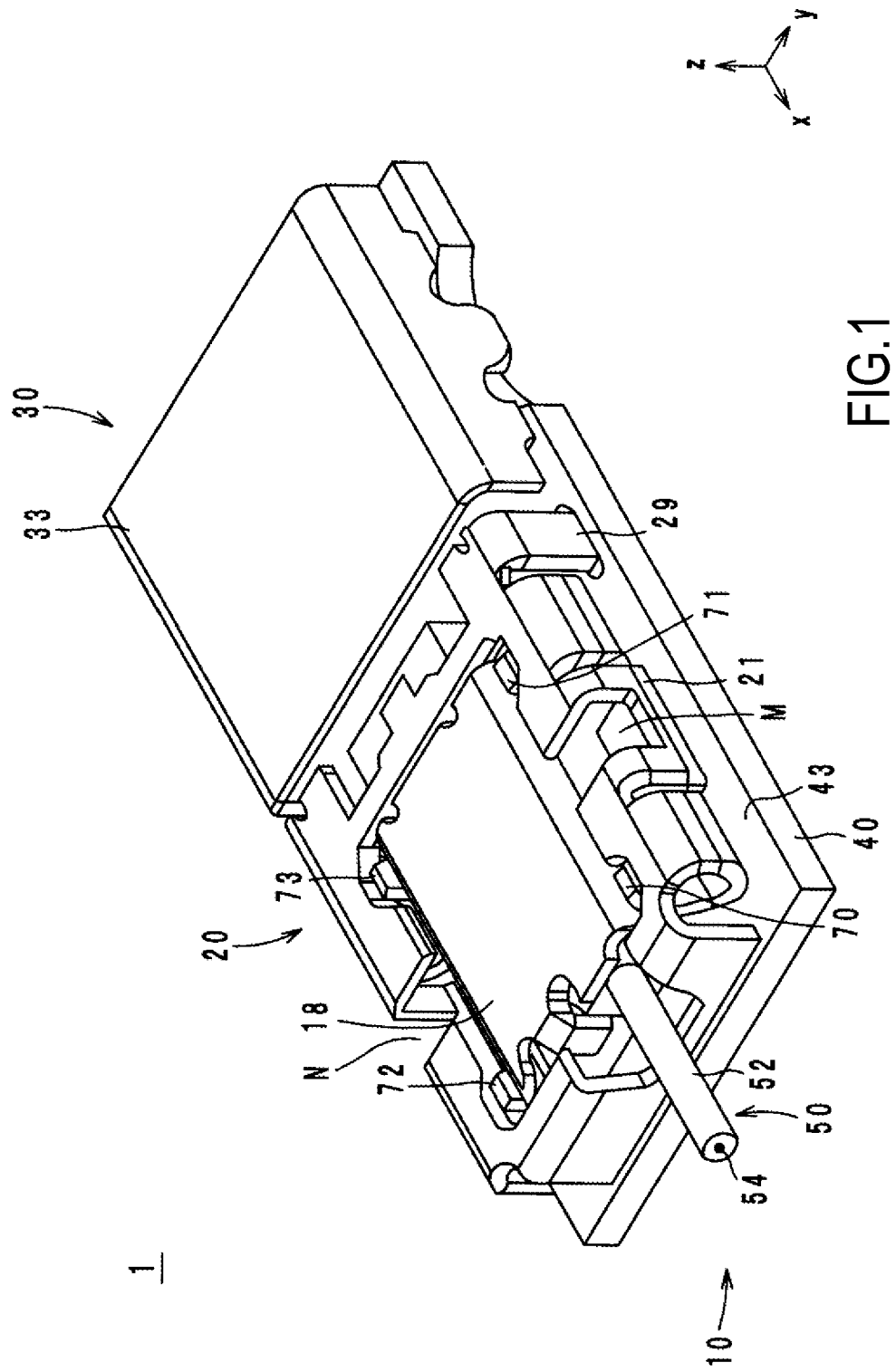
FIG. 1 is an external perspective view of a connector according to one exemplary embodiment.

The inventors realized that the connector 500 of Patent Document 1 has low durability because the plug-side housing 526 and the receptacle-side housing 566 are made of resin materials. Thus, when the plug 502 is repeatedly mounted to and dismounted from the receptacle 506, the plug-side housing 526 and the receptacle-side housing 566 become worn and the plug 502 is easily dismounted from the receptacle 506.

Connectors according to exemplary embodiments of the present disclosure that address the above shortcomings will now be described with reference to the drawings.

Figure 2:
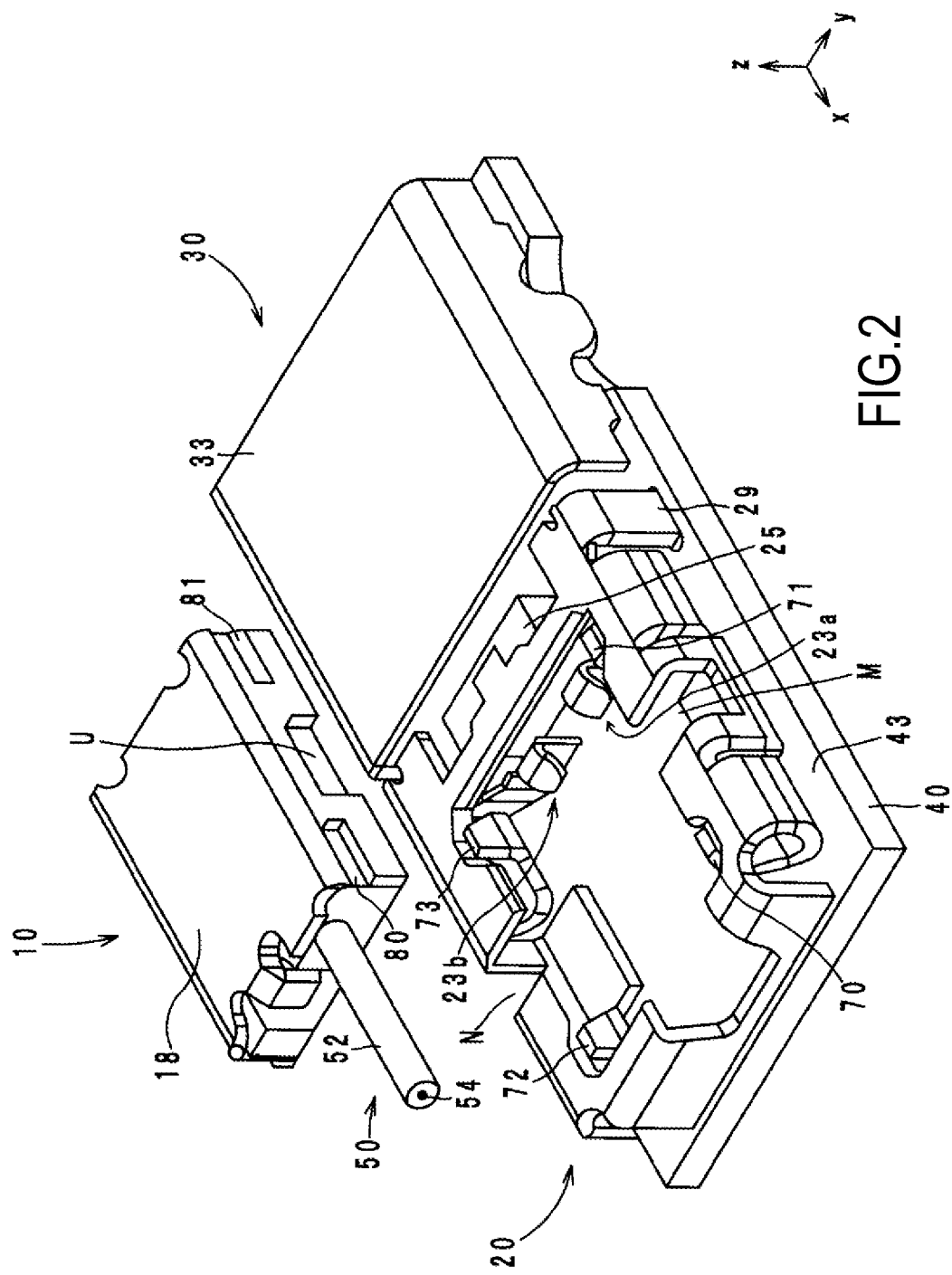
FIG. 2 is an external perspective view in which a plug is removed from a connector.
Figure 3:
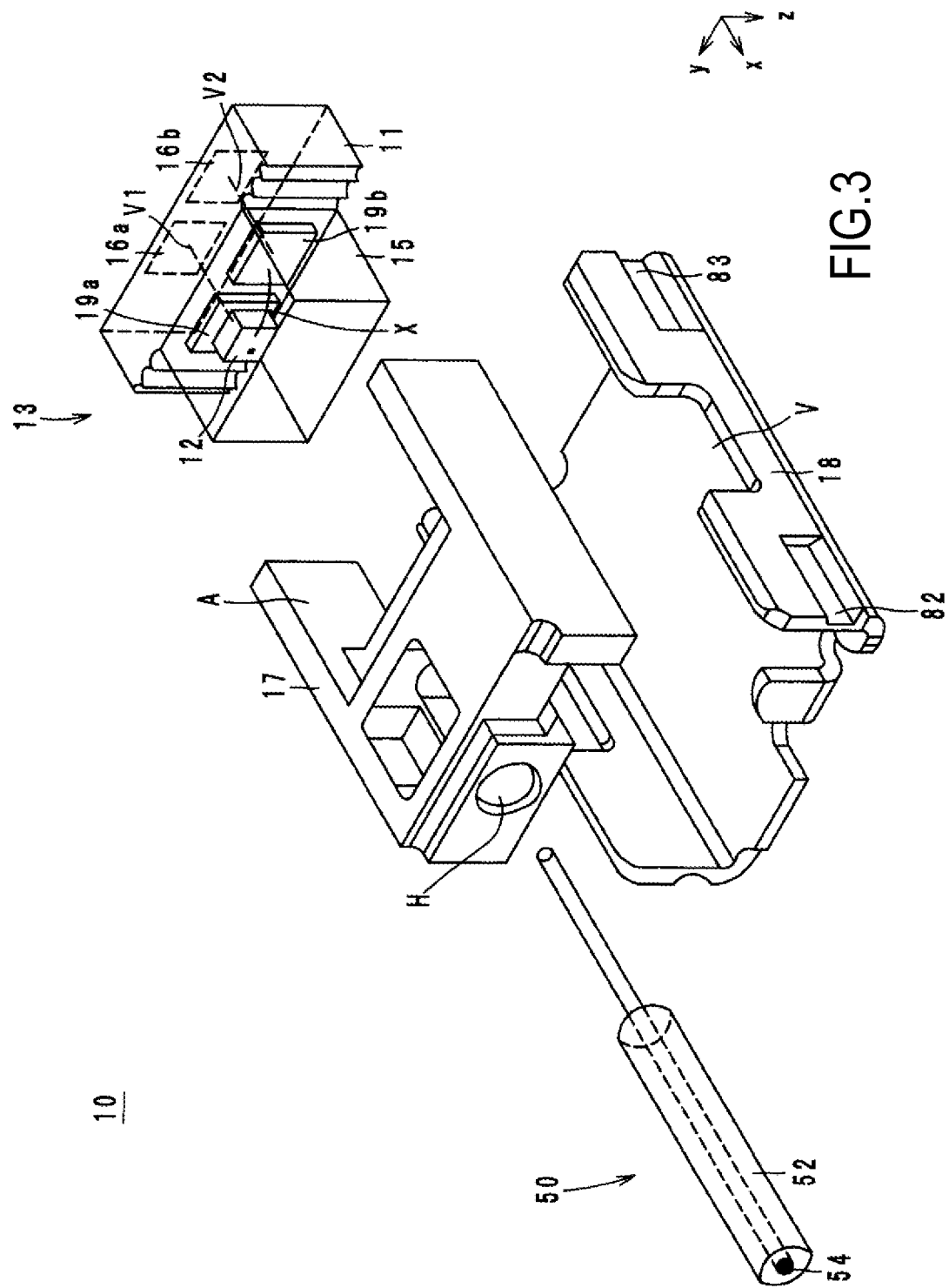
FIG. 3 is an exploded perspective view of the plug.
Figure 4:
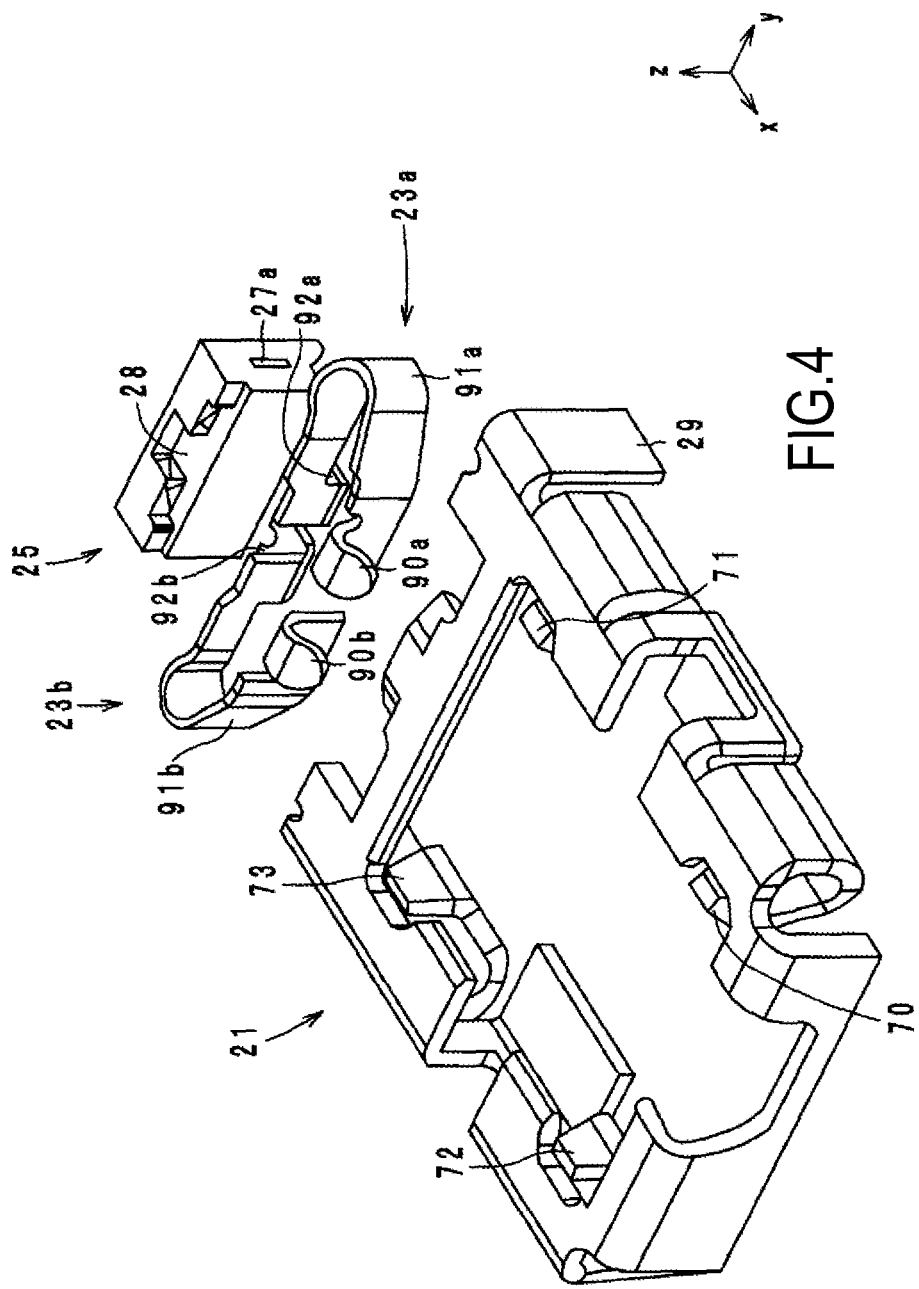
FIG. 4 is an exploded perspective view of a receptacle.
Figure 5:
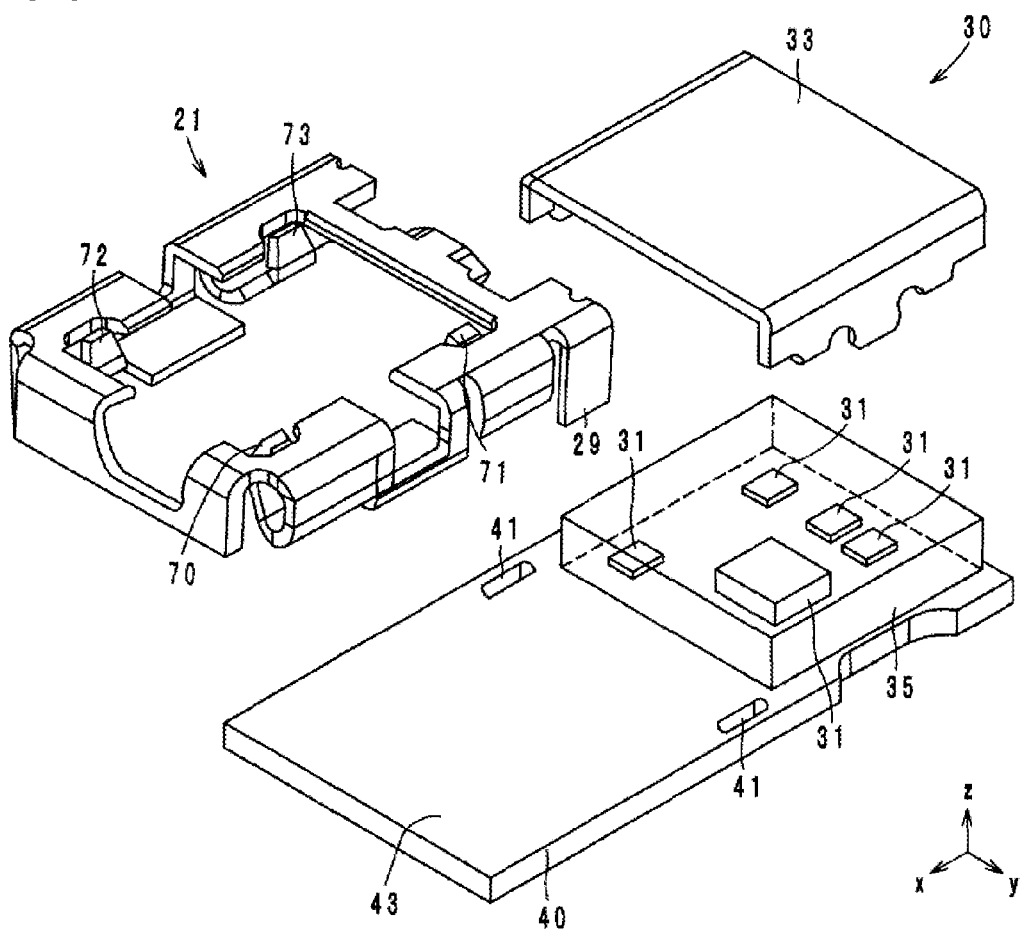
FIG. 5 is a diagram illustrating a situation in which a metal housing and an electric circuit part are mounted to a circuit board.

First, a schematic configuration of a connector according to one embodiment of the present invention will be described. FIG. 1 is an external perspective view of a connector 1 according to the embodiment of the present invention. FIG. 2 is an external perspective view in which a plug 10 is removed from the connector 1. FIG. 3 is an exploded perspective view of the plug 10. FIG. 4 is an exploded perspective view of a receptacle 20. FIG. 5 is a diagram illustrating a situation in which a metal housing 21 and an electric circuit part 30 are mounted to a circuit board 40.

As shown in FIGS. 1 and 2, the connector 1 includes the plug 10, the receptacle 20, the electric circuit part 30, and the circuit board 40. The plug 10 is provided at one end of an optical fiber 50 and converts an optical signal to an electric signal or converts an electric signal to an optical signal. Hereinafter, the direction in which the optical fiber 50 extends is defined as an x-axis direction, the up-down direction is defined as a z-axis direction, and the direction orthogonal to the x-axis direction and the z-axis direction is defined as a y-axis direction. The x-axis direction, the y-axis direction, and the z-axis direction are orthogonal to each other.

The circuit board 40 has electric circuits on its surface and therein, and has a mounting surface 43 parallel to an xy plane as shown in FIGS. 1 and 5. In addition, holes 41 are provided in the mounting surface 43 of the circuit board 40. The holes 41 are provided near a side of the mounting surface 43 on the positive direction side in the y-axis direction and near a side of the mounting surface 43 on the negative direction side in the y-axis direction so as to be opposed to each other. The receptacle 20 and the electric circuit part 30 are mounted on the circuit board 40 so as to be aligned in order from the positive direction side toward the negative direction side in the x-axis direction.

The optical fiber 50 is composed of a cover 52 and a core wire 54. The core wire 54 is composed of a cladding and a core made of glass or resin. The cover 52 is any one of an acrylic, epoxy, nylon, polyester elastomer or a non-halogen resin and covers the core wire 54. In an end portion of the optical fiber 50 on the negative direction side in the x-axis direction, the cover 52 is removed and the core wire 54 is exposed as shown in FIG. 3.

As shown in FIG. 3, the plug 10 includes a photoelectric conversion device 12, a mounted portion 13, a ferrule 17, and a metal member 18. The photoelectric conversion device 12 is a light emitting/receiving device composed of a semiconductor device that is not covered with a metal case. That is, the photoelectric conversion device 12 is a bare chip.

The mounted portion 13 is composed of a substrate 11, a sealing resin 15, external terminals 16a and 16b, terminal portions 19a and 19b, and vias V1 and V2.

The substrate 11 is a resin substrate having a rectangular parallelepiped shape. As described later, the photoelectric conversion device 12 is mounted on a side surface of the substrate 11 on the positive direction side in the x-axis direction.

The external terminals 16a and 16b are provided on a side surface of the substrate 11 on the negative direction side in the x-axis direction so as to be aligned in order from the positive direction side toward the negative direction side in the y-axis direction. The terminal portions 19a and 19b are provided on the side surface of the substrate 11 on the positive direction side in the x-axis direction so as to be aligned in order from the positive direction side toward the negative direction side in the y-axis direction. Here, the external terminal 16a and the terminal portion 19a face each other and are connected to each other via the via V1. The external terminal 16b and the terminal portion 19b face each other and are connected to each other via the via V2. In addition, the photoelectric conversion device 12 is mounted on the terminal portion 19a. Furthermore, the terminal portion 19b and the photoelectric conversion device 12 are electrically connected to each other by means of wire bonding using a wire X.

The sealing resin 15 is made of a transparent resin and seals the photoelectric conversion device 12 mounted on the substrate 11. Thus, the photoelectric conversion device 12 is buried in the mounted portion 13.

The ferrule 17 is a resin member having a rectangular parallelepiped shape. The ferrule 17 fixes the optical fiber 50 and the mounted portion 13 in a state where the core wire 54 and the photoelectric conversion device 12 face each other. The ferrule 17 has a recess A and a hole H. The recess A is formed by a side surface of the ferrule 17 on the negative direction side in the x-axis direction being recessed. Thus, the sealing resin 15 is fitted into the recess A, and the mounted portion 13 is fixed to the ferrule 17. The hole H is a cylindrical void and is provided so as to extend from a side surface of the ferrule 17 on the positive direction side in the x-axis direction toward the negative direction side in the x-axis direction and penetrate the ferrule 17 to the recess A. Thus, when the core wire 54 is inserted into the hole H from the positive direction side in the x-axis direction, the photoelectric conversion device 12 and the optical fiber 50 face each other and are optically connected to each other.

The metal member 18 is provided so as to cover the photoelectric conversion device 12 from the positive direction side in the z-axis direction (from above). The metal member 18 covers surfaces of the mounted portion 13 and the ferrule 17 on the positive direction side in the z-axis direction (on the upper side), side surfaces of the mounted portion 13 and the ferrule 17 on the positive direction side in the y-axis direction, and side surfaces of the mounted portion 13 and the ferrule 17 on the negative direction side in the y-axis direction. In addition, as shown in FIGS. 2 and 3, the metal member 18 has recesses 80, 81, 82, an 83. As shown in FIG. 2, the recesses 80 and 81 are provided by a side surface of the metal member 18 on the positive direction side in the y-axis direction being recessed. The recess 80 is provided on the positive direction side in the x-axis direction with respect to the recess 81. As shown in FIG. 3, the recesses 82 and 83 are provided on a side surface of the metal member 18 on the negative direction side in the y-axis direction being recessed. The recess 82 is provided on the positive direction side in the x-axis direction with respect to the recess 83.

The receptacle 20 includes the metal housing 21, spring terminals 23a and 23b, and an insulating portion 25 as shown in FIG. 4, and is mounted on the circuit board 40. The plug 10 is mounted to receptacle 20 from the positive direction side in the z-axis direction (i.e., from above).

The metal housing 21 is a housing to which the plug 10 is fixed, or removably mounted, and has a shape surrounding the periphery of the plug 10 (i.e., a square hollow shape) when being seen from the positive direction side in the z-axis direction (i.e., from above or in a direction of insertion of the plug into the receptacle). The metal housing 21 includes fixed portions 29 and spring members 70, 71, 72, and 73, and is formed by a square hollow shaped metal plate being bent. More specifically, the metal housing 21 is formed by a side of the metal plate on the positive direction side in the x-axis direction, a side of the metal plate on the positive direction side in the y-axis direction, and a side of the metal plate on the negative direction side in the y-axis direction being bent toward the negative direction side in the z-axis direction. The fixed portions 29 are formed by portions of the sides of the metal plate on the positive direction side in the y-axis direction and on the negative direction side in the y-axis direction being bent toward the negative direction in the z-axis direction, and are located at end portions, on the negative direction side in the x-axis direction, of side surfaces of the metal housing 21 on the positive direction side in the y-axis direction and on the negative direction side in the y-axis direction. As shown in FIGS. 1 and 2, the fixed portions 29 are press-fitted into the holes 41 of the circuit board 40. Thus, the receptacle 20 is mounted on the circuit board 40. In this case, the fixed portions 29 are connected to a ground conductor within the circuit board 40. Thus, the metal housing 21 is kept at a ground potential.

The spring members 70 and 71 are formed by portions of a side of the metal plate, constituting the metal housing 21, on the positive direction side in the y-axis direction being bent into a U shape. Ends of the spring members 70 and 71 are located within a region surrounded by the metal housing 21 when being seen in a planar view from the positive direction side in the z-axis direction. The spring member 70 is located on the positive direction side in the x-axis direction with respect to the spring member 71. The spring members 72 and 73 are formed by portions of a side of the metal plate, constituting the metal housing 21, on the negative direction side in the y-axis direction being bent into a U shape. Ends of the spring members 72 and 73 are located within the region surrounded by the metal housing 21 when being seen in a planar view from the positive direction side in the z-axis direction. The spring member 72 is located on the positive direction side in the x-axis direction with respect to the spring member 73.

The spring terminals 23a and 23b are terminals for signals. Hereinafter, the spring terminals 23a and 23b will be described in more detail.

The spring terminal 23a is composed of a contact portion 90a, a spring portion 91a, and a fixed portion 92a. The spring terminal 23b is composed of a contact portion 90b, a spring portion 91b, and a fixed portion 92b. The spring portions 91a and 91b are U-shaped plate springs connecting the contact portion 90a and the fixed portion 92a, and the contact portion 90b and the fixed portion 92b, respectively. The spring portions 91a and 91b are fixed to the metal housing 21 without being in contact with the metal housing 21.

The contact portions 90a and 90b are end portions located on the positive direction side in the x-axis direction among end portions of the spring terminals 23a and 23b. The contact portions 90a and 90b are bent in inverse U shapes when being seen from the positive direction side in the y-axis direction, and are drawn toward the positive direction side of the spring portions 91a and 91b in the x-axis direction. The contact portions 90a and 90b are in contact with a side surface of the plug 10 on the negative direction side in the x-axis direction. More specifically, the contact portions 90a and 90b are in contact with the external terminals 16a and 16b, respectively, of the plug 10.

The fixed portions 92a and 92b are end portions located on the negative direction side in the x-axis direction among the end portions of the spring terminals 23a and 23b, and extend toward the negative direction side in the x-axis direction. The fixed portions 92a and 92b are connected to the end portions of the spring terminals 23a and 23b on the negative direction side in the x-axis direction. The fixed portions 92a and 92b are connected to a land (not shown) of the circuit board 40 when the receptacle 20 is mounted.

The spring terminals 23a and 23b configured as described above have U shapes when being seen from the positive direction side in the z-axis direction (i.e., from above or in a direction of insertion of the plug into the receptacle). In the spring terminal 23a, its folded-back portion of the U shape faces toward the positive direction side in the y-axis direction. In the spring terminal 23b, its folded-back portion of the U shape faces toward the negative direction side in the y-axis direction. Thus, the spring terminal 23a and the spring terminal 23b have a structure symmetrical to the x-axis. The spring terminals 23a and 23b are in contact at their contact portions 90a and 90b with the external terminals 16a and 16b and are connected at their fixed portions 92a and 92b to the land of the circuit board 40, thereby serving as terminals that relay transmission of signals between the plug 10 and the circuit board 40.

The insulating portion 25 has a rectangular parallelepiped shape and is made of a resin material. The insulating portion 25 is formed integrally with the spring terminals 23a and 23b. Thus, the spring terminals 23a and 23b are fixed to the metal housing 21 without being electrically connected to the metal housing 21. More specifically, the spring portions 91a and 91b are drawn from side surfaces of the insulating portion 25 on the positive direction side in the y-axis direction and on the negative direction side in the y-axis direction, and the fixed portions 92a and 92b are drawn from a back surface of the insulating portion 25. The insulating portion 25 is fixed at its upper surface to the metal housing 21.

As shown in FIG. 5, the electric circuit part 30 is mounted on the mounting surface 43 of the circuit board 40 on the negative direction side of the metal housing 21 in the x-axis direction, and processes signals transmitted by the plug 10. The electric circuit part 30 includes a circuit element 31, a metal cap 33, and a resin portion 35. The circuit element 31 is a chip-type electronic component mounted on the mounting surface 43 of the circuit board 40 and is an element for driving the photoelectric conversion device 12. As shown in FIG. 5, the circuit element 31 is sealed by the resin portion 35. The metal cap 33 is a cap that covers the circuit element 31 sealed by the resin portion 35. The metal cap 33 covers the resin portion 35 from the positive direction side in the z-axis direction, the positive direction in the y-axis direction, and the negative direction in the y-axis direction.

The plug 10 is fitted to the receptacle 20 configured as described above from the positive direction side in the z-axis direction. In this case, as shown in FIGS. 1 and 2, the spring members 70 to 73 engage the recesses 80 to 83, respectively. Furthermore, the spring terminals 23a and 23b and the external terminals 16a and 16b are electrically connected to each other. Moreover, the plug 10 is pressed by the spring terminals 23a and 23b toward the positive direction side in the x-axis direction. Thus, a side of the metal member 18 on the positive direction side in the x-axis direction is pressed against the metal housing 21. Thus, the plug 10 is fixed to the receptacle 20 only by the metal member 18 and the metal housing 21 being fitted to each other.

Figure 6:
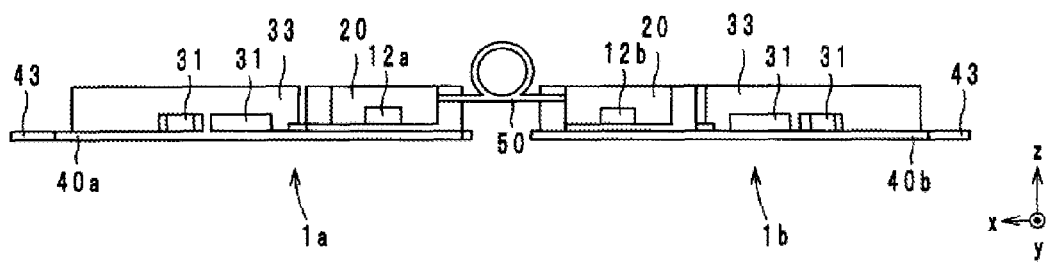
FIG. 6 is a schematic configuration diagram of a transmitting/receiving system in which connectors are used.

FIG. 6 is a schematic configuration diagram of a transmitting/receiving system 100 in which connectors 1 are used. As shown in FIG. 6, a reception connector 1a and a transmission connector 1b are provided at both ends, respectively, of the optical fiber 50. The reception connector 1a includes a reception circuit board 40a and a photodiode 12a. The transmission connector 1b includes a transmission circuit board 40b and a VCSEL (vertical cavity surface-emitting laser) 12b. Thus, signals are transmitted from the transmission connector 1b to the reception connector 1a through the optical fiber 50.

As described above, according to the connector 1, it is possible to protect the photoelectric conversion device 12 from noise and provide the connector 1 having high durability.

Figure 10:
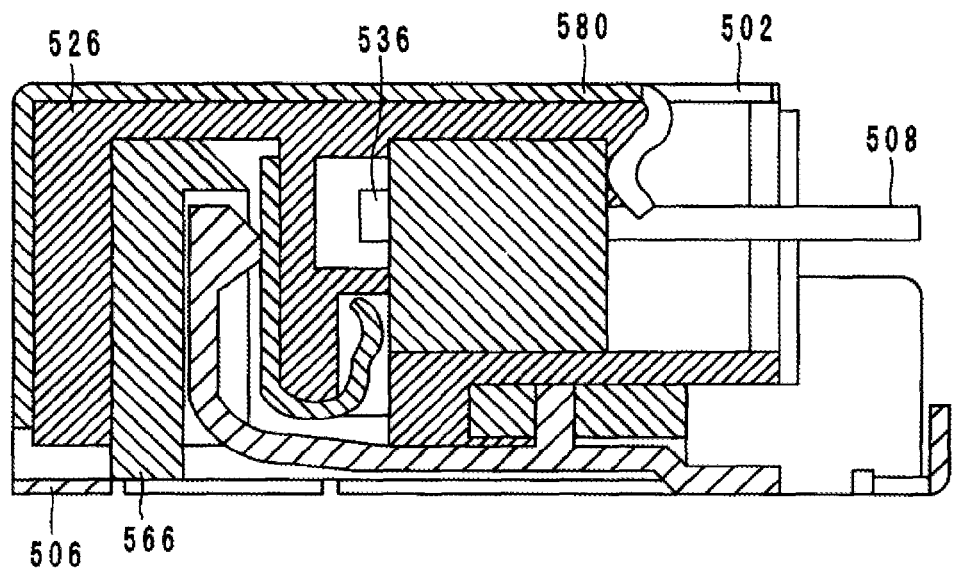
FIG. 10 is a cross-sectional structure diagram of a connector described in Patent Document 1.

More specifically, in the existing connector 500 shown in FIG. 10, the plug 502 is mounted to the receptacle 506 by the plug-side housing 526 being fitted to the receptacle-side housing 566. However, the plug-side housing 526 and the receptacle-side housing 566 are made of resin materials and hence have low durability. Thus, when the plug 502 is repeatedly mounted to and dismounted from the receptacle 506, the plug-side housing 526 and the receptacle-side housing 566 become worn and the plug 502 is easily dismounted from the receptacle 506.

Meanwhile, in the connector 1, as shown in FIG. 1, the plug 10 and the receptacle 20 are fixed to each other only by the metal member 18 and the metal housing 21 being fitted to each other. Each of the metal member 18 and the metal housing 21 is made of metal and hence has excellent durability. Thus, even when the plug 10 is repeatedly mounted to and dismounted from the receptacle 20, the metal member 18 and the metal housing 21 do not greatly wear. Therefore, the connector 1 is able to keep a strong fitting force.

As shown in FIG. 4, since the metal housing 21 surrounds the plug 10, the plug 10 is hard to be removed from the receptacle 20 and it is possible to increase a fitting force between the plug 10 and the receptacle 20.

Furthermore, the metal cap 33, the metal member 18, and the metal housing 21 are connected to the ground, and hence have the same potential. Thus, the entirety of the connector 1 is blocked from external noise and the connector 1 is able to exert a shield effect. The shield effect allows the ESD (electrostatic discharge) resistance and the EMC (electromagnetic compatibility) resistance of the circuit element 31 to be improved. In addition, the shield effect allows the EMC resistance of an external electrical interface to be improved.

Each of the metal member 18 and the metal housing 21 is made of metal and connected to the ground conductor (not shown) within the circuit board 40. Thus, a high current generated by static electricity is led to the ground via the metal member 18, the metal housing 21, and the ground conductor within the circuit board 40.

Figure 7:
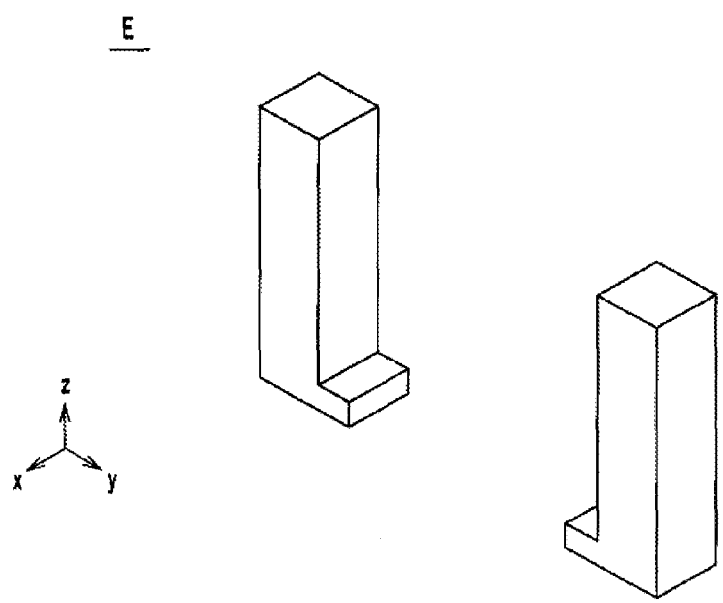
FIG. 7 is a diagram illustrating tools used when the plug is inserted into or removed from the receptacle.

FIG. 7 is a diagram illustrating tools E used when the plug 10 is inserted into or removed from the receptacle 20. In the connector 1, the plug 10 is inserted into or removed from the receptacle 20 by using the tools E, and thus it is unnecessary to touch the optical fiber 50 and the like with a hand in insertion or removal of the plug 10. Thus, it is possible to alleviate the stress in the optical fiber 50, and hence a load is not applied to the optical fiber 50 and it is possible to prevent failure such as wire breakage. More specifically, the L-shaped tools E shown in FIG. 7 are fitted into recesses U and V (see FIG. 2) of the plug 10 through cuts M and N, and the plug 10 is inserted into or removed from the receptacle 20. In inserting the plug 10 into the receptacle 20, the plug 10 is pinched by the tools E and fitted from the positive direction side of the metal housing 21 in the z-axis direction.

In addition, it is possible to confirm fitting between the plug 10 and the receptacle 20 through the cuts M and N, and thus the efficiency of the fitting operation is improved.

In the receptacle 20, as shown in FIGS. 1 and 2, the fixed portion 29 is press-fitted into the holes 41. Thus, in removing the plug 10 from the receptacle 20, even when stress is applied to the receptacle 20 toward the positive direction side in the z-axis direction by lifting the plug 10 toward the positive direction side in the z-axis direction, the receptacle 20 is not dismounted from the circuit board 40 since the receptacle 20 is securely mounted on the circuit board 40.

As shown in FIGS. 1 and 2, the plug 10 is in contact with the receptacle 20 through the spring members 70 to 73 made of metal. Thus, wear is less likely to occur between the plug 10 and the spring members 70 to 73 and it is possible to prevent bias of contact caused by shape variations of the plug 10 and the spring members 70 to 73.

In addition, as shown in FIG. 4, the spring terminals 23a and 23b have U shapes and their folded-back portions face toward the y-axis direction when been seen from the positive direction side in the z-axis direction (i.e., from above or in a direction of insertion of the plug into the receptacle). Thus, it is possible to decrease the height of the connector 1 as compared to a connector in which the folded-back portions of the U shapes of the spring terminals face toward the z-axis direction. In addition, since the spring terminals 23a and 23b have U shapes, the spring terminals 23a and 23b easily bend even when a small force is applied thereto.

The plug 10 and the receptacle 20 are fixed to each other by the metal member 18 and the metal housing 21 being fitted to each other. Thus, a click feel is strong when fitting, and it is possible to feel completion of the fitting by sound and touch.

Figure 8:
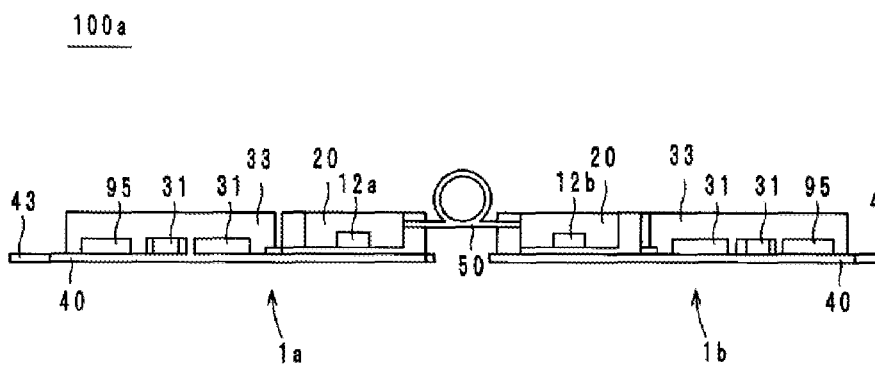
FIG. 8 is a schematic configuration diagram of a transmitting/receiving system in which connectors according to another exemplary embodiment are used.

The connector 1 configured as described above is not limited to one described in the above embodiment. Thus, it is possible to change the connector 1 within the scope of its gist. FIG. 8 is a schematic configuration diagram of a transmitting/receiving system 100a in which connectors 1 according to another embodiment are used.

As shown in FIG. 8, SERDES (serializer/deserializer) devices 95 may be provided in connectors 1a and 1b. Each SERDES device 95 is mounted on a circuit board 40. Each SERDES device 95 converts a serial signal to a parallel signal and converts a parallel signal to a serial signal. Thus, the interval between a drive circuit and each SERDES device is decreased, and hence optical transmission characteristics are improved.

Figure 9:
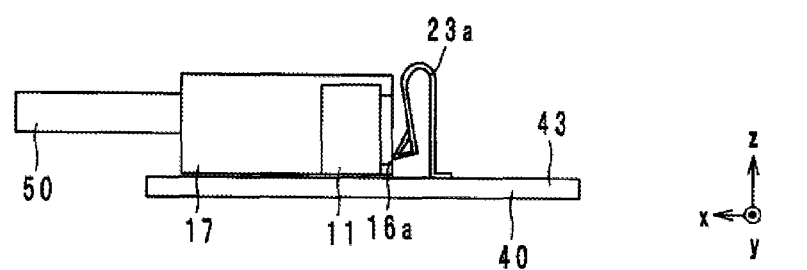
FIG. 9 is a schematic configuration diagram of a connector according to another exemplary embodiment.

FIG. 9 is a schematic configuration diagram of a connector 1 according to another exemplary embodiment. As shown in FIG. 9, the spring terminals 23a and 23b may have inverse U shapes when being seen from the y-axis direction (i.e., the lateral direction). In FIG. 9, the receptacle 20 is not shown. Since the spring terminals 23a and 23b have inverse U shapes when being seen from the y-axis direction, it is possible to decrease the interval between the spring terminals 23a and 23b as compared with the spring terminals in the embodiment. In other words, it is possible to reduce the size of the connector 1 in the y-axis direction. In addition, it can be more effective when using multiple spring terminals.

In the connector 1, the metal cap 33 and the metal housing 21 may be integrated with each other. Thus, it is possible to improve the ESD resistance and the EMC resistance of the entirety of the connector 1. In addition, since the number of components is reduced, it is possible to reduce the cost, and since the number of man-hours during manufacture is reduced, the manufacturing time is shortened.

The circuit element 31 may be provided within the plug 10. Thus, it is unnecessary to provide a circuit part on the circuit board 40. In addition, the transmission characteristics can be improved and stabilization is possible.

A plurality of optical fibers 50 and a plurality of photoelectric conversion devices 12 may be mounted to the plug 10. Thus, it is possible to increase the transmission capacity. In addition, the optical fibers 50 and the photoelectric conversion devices 12 may be arrayed.

The optical fiber 50 may be an organic optical waveguide or POF (plastic or polymer optical fiber), in addition to a quartz fiber. It is possible to make a selection from these optical transmission lines according to a purpose.

Embodiments according to the present disclosure are effective for connectors and are particularly excellent in protecting a photoelectric conversion device from noise and having high durability.

That which is claimed is:

1. A connector comprising:
   a plug provided at one end of an optical fiber; and
   a receptacle to which the plug is removably mounted, wherein the plug includes:
      a photoelectric conversion device composed of a semiconductor device that is not covered with a metal case; and
      a metal member provided so as to cover a side of the photoelectric conversion device,
   the receptacle includes a metal housing to which the plug is fixed, and
   the plug and the receptacle are fixed to each other only by engagement between the metal member and the metal housing, wherein
   the metal housing includes spring members positioned along sides of the metal housing, and
   the metal housing has a shape that surrounds a periphery of the plug when being seen in a direction of insertion of the plug into the receptacle.

2. The connector according to claim 1, wherein the spring members are bent into a U shape when being seen in a direction in which the optical fiber extends.

3. The connector according to claim 1, wherein the receptacle further includes:
   a spring terminal pressing the plug against the metal housing; and
   an insulating member fixing the spring terminal to the metal housing.

4. The connector according to claim 3, wherein
   the spring terminal has a U shape when being seen in the direction of insertion of the plug into the receptacle and is fixed to the insulating member, and
   an end portion of the spring terminal is in contact with the plug.

5. The connector according to claim 2, wherein the receptacle further includes:

a spring terminal pressing the plug against the metal housing; and an insulating member fixing the spring terminal to the metal housing.

6. The connector according to claim 5, wherein the spring terminal has a U shape when being seen in a direction of insertion of the plug into the receptacle and is fixed to the insulating member, and an end portion of the spring terminal is in contact with the plug.

7. The connector according to claim 1, further comprising:

an electric circuit part processing a signal transmitted by the plug; and a circuit board on which the electric circuit part and the receptacle are mounted.

8. The connector according to claim 7, wherein the electric circuit part includes:

a circuit element for driving the photoelectric conversion device; and a metal cap covering the circuit element.

9. The connector according to claim 8, wherein the metal cap and the metal housing are integrated with each other.

10. The connector according to claim 1, wherein the plug further includes a circuit element for driving the photoelectric conversion device.

11. The connector according to claim 5, wherein the spring terminal has an inverse U shape when seen from a direction lateral to the direction of insertion.

* * * * *